(12) United States Patent
Franke

(10) Patent No.: US 9,912,998 B2
(45) Date of Patent: Mar. 6, 2018

(54) MULTI-SWITCH HAVING A DYNAMIC INPUT ASSIGNMENT

(71) Applicant: Robert Bosch GmbH, Stuttgart (DE)

(72) Inventor: Michael Franke, Hameln (DE)

(73) Assignee: ROBERT BOSCH GMBH, Stuttgart (DE)

( * ) Notice: Subject to any disclaimer, the term of this patent is extended or adjusted under 35 U.S.C. 154(b) by 410 days.

(21) Appl. No.: 14/403,511

(22) PCT Filed: May 22, 2013

(86) PCT No.: PCT/EP2013/060438
§ 371 (c)(1),
(2) Date: Nov. 24, 2014

(87) PCT Pub. No.: WO2013/174829
PCT Pub. Date: Nov. 28, 2013

(65) Prior Publication Data
US 2015/0304731 A1 Oct. 22, 2015

(30) Foreign Application Priority Data
May 25, 2012 (DE) .................. 10 2012 208 801

(51) Int. Cl.
*H04N 7/20* (2006.01)
*H04N 21/61* (2011.01)
(Continued)

(52) U.S. Cl.
CPC ........ *H04N 21/6143* (2013.01); *H04H 40/90* (2013.01); *H04N 7/106* (2013.01);
(Continued)

(58) Field of Classification Search
None
See application file for complete search history.

(56) References Cited

U.S. PATENT DOCUMENTS

| 2009/0006625 A1* | 1/2009 | Gutknecht | ............... H04N 7/20 |
| | | | 709/226 |
| 2010/0103146 A1* | 4/2010 | Prince | .................... G09G 5/003 |
| | | | 345/204 |
| 2011/0126247 A1* | 5/2011 | Howarter | ........... H04N 7/17318 |
| | | | 725/95 |

FOREIGN PATENT DOCUMENTS

| CN | 1805511 A | 7/2006 |
| DE | 202 11 276 | 11/2002 |

(Continued)

OTHER PUBLICATIONS

International Search Report for PCT/EP2013/060438, dated Oct. 18, 2013.

*Primary Examiner* — Kunal Langhnoja
(74) *Attorney, Agent, or Firm* — Norton Rose Fulbright US LLP; Gerard Messina

(57) ABSTRACT

A multi-switch for distributing satellite signals of different levels includes: multiple inputs for connection to controllable sources for satellite signals of the different levels; multiple outputs for connection to receivers for the satellite signals; and a switching unit for connecting outputs to inputs, the switching unit receiving requests for levels via the inputs and assigning the inputs dynamically to outputs on which the same requests were output. The switching unit outputs the requests for levels in accordance with the sequence of their arrival on unused inputs in a corresponding sequence. The requests are dynamically switched at the inputs in accordance with the requests at the outputs and are not assigned according to a predetermined scheme.

7 Claims, 6 Drawing Sheets

(51) Int. Cl.
*H04H 40/90* (2008.01)
*H04N 7/10* (2006.01)
*H04N 21/426* (2011.01)
*H04N 21/436* (2011.01)

(52) U.S. Cl.
CPC ........... *H04N 7/20* (2013.01); *H04N 21/4263* (2013.01); *H04N 21/43615* (2013.01)

(56) References Cited

FOREIGN PATENT DOCUMENTS

| | | | |
|---|---|---|---|
| DE | 20 2004 007 763 | 7/2004 | |
| EP | 1 347 644 | 9/2003 | |
| EP | 1 760 917 | 3/2007 | |
| EP | 1760917 A1 * | 3/2007 | ............. H04H 20/63 |

* cited by examiner

MULTI-SWITCH HAVING A DYNAMIC INPUT ASSIGNMENT

BACKGROUND OF THE INVENTION

1. Field of the Invention

The present invention relates to a multi-switch having a dynamic input assignment.

2. Description of the Related Art

A receiving system for satellite signals typically includes a satellite antenna including a parabolic mirror and a low-noise signal converter (LNB) and a satellite receiver. Signals emitted by a communication satellite are focused with the aid of the parabolic mirror on the LNB and received thereby. The LNB converts a part of the received signals to a predetermined intermediate frequency and provides the converted signal to the receiver. The receiver decodes from this signal those audio or video signals which are required for output of a predetermined channel.

A satellite may emit signals of different frequencies and polarization levels. A typical lower frequency band (low band) is in the range of 10.70 GHz to 11.70 GHz, a typical upper frequency band (high band) is in the frequency range of 11.70 GHz to 12.75 GHz. The signals may be polarized horizontally or vertically. Four so-called levels, on which satellite signals may be received, result by combination of these alternatives. Typical household wiring is not capable of providing sufficient bandwidth for transmitting all levels in a single cable. To provide channels from more than one of the levels simultaneously at the receiver, more cable connections are typically necessary between the satellite antenna and the receiver. A receiver may typically apply a predetermined combination of a DC voltage and a pilot frequency in the audible range at its input to activate the LNB to output signals of the assigned level.

Multi-switches, which may be introduced into the signal cable between the LNB and the receiver, have the task of distributing signals of multiple levels to one or multiple receiver(s). In some specific embodiments, a multi-switch may be integrated with the LNB.

Published German patent application document DE 20 2004 007 763 U1 describes a multi-switch having inputs and outputs for distributing satellite signals.

Published German patent application document DE 202 11 276 U1 describes a multi-switch including a programming interface, to enable an assignment of satellite signals of different polarizations and intermediate frequencies to inputs of the multi-switch.

In general, in an apartment having multiple receivers, only as many channels may be received simultaneously from different levels as cables lead from the apartment to the satellite antenna. Since the wiring from a multi-switch or LNB is always to be carried out radially, an outlay for providing additional cables may be extremely complex. To receive all analog TV channels from Astra satellites, for example, previously double wiring has been sufficient to be able to receive both levels of the low band. Since the shutdown of the analog channels, it has been important to also be able to receive the levels of the high band for the digital channels in addition to the levels of the low band. The present invention is based on the object of increasing usability of channels from different levels, without having to lay new cables.

BRIEF SUMMARY OF THE INVENTION

A multi-switch according to the present invention for distributing satellite signals of different levels includes multiple inputs for connecting to controllable sources for satellite signals of the different levels and multiple outputs for connecting to receivers for the satellite signals. Furthermore, a switching unit for connecting outputs to inputs is provided, the switching unit being configured to receive requests for levels via the inputs and to dynamically assign outputs, on which the same requests are output, to the inputs. The switching unit is furthermore configured to output the requests for levels on unused inputs in accordance with the sequence of their arrival.

In a delimitation from the related art, in this switching unit, the requests may be dynamically switched at the inputs in accordance with the requests at the outputs and not allocated according to a predetermined scheme. A dynamic assignment of inputs to levels may thus be achieved, which does not increase the number of simultaneously receivable channels beyond the number of the connections between inputs of the multi-switch and the signal sources, but does enable optimum usage of the inputs connected to the sources. The number of practically usable channels may thus be significantly increased with use of the described multi-switch. In addition, the described multi-switch may be used in an existing installation, without requiring adaptations on the part of other components. An installation of additional connections between the receivers or the multi-switch and the sources may not be necessary.

For example, an apartment which is connected via two parallel cables to an LNB or multi-switch may receive at any point in time two channels from different levels and an arbitrary number of further channels from these two levels. The needs of a typical two to four person household may thus be satisfied in most cases, without requiring an investment in additional infrastructure for distributing the satellite signals from a central satellite antenna.

In another specific embodiment, the switching unit is configured to reject a received request for a level if the request is not output on a used input and no further input connected to a source is present. A competing access to one of the inputs may thus be avoided. For example, a situation may be precluded in which a reception of a first channel from a first band with the aid of a first receiver is interrupted by a request of a second channel from a second band by a second receiver. This may be particularly important, for example, in the event of unattended reception and recording of the first channel.

In one preferred specific embodiment, the switching unit is additionally configured to output an error signal via the output, via which the rejected request was received. The error signal may include a notification of already used levels, for example, so that a user may select another channel from one of these levels. The error signal may also include a notification of the receivers which have requested the used levels, to provide an easier possibility for the user of a consultation with users of the mentioned receivers.

In another specific embodiment, precisely two inputs for connection to sources for satellite signals and more than two outputs are provided. This configuration corresponds to an installation which is frequently encountered, in particular in the case of a satellite receiver system for a plurality of apartments, each apartment being connected with the aid of two cables to a central satellite antenna or a multi-switch connected thereto.

In still another specific embodiment, the multi-switch also includes a further input for connection to a further signal source in a frequency range independent from the satellite reception, the switching unit being configured to make the independent frequency range available on all outputs.

In particular the reception of a terrestrial broadcast signal may thus be assisted, which does not use the connection between the inputs of the described multi-switch and the satellite antenna. The distribution of the terrestrial signal may therefore be usable simultaneously on all outputs independently of the control of the satellite signals.

A method according to the present invention for controlling a multi-switch having inputs for connection to controllable sources for satellite signals of the different levels and outputs for connection to multiple receivers for the satellite signals includes steps of receiving a request for satellite signals of a first level via a first output, outputting the received request on an unused input of the multi-switch, if none of the used inputs outputs the same request, and connecting the first output to the input, via which the received request is output.

A dynamic assignment of levels to the inputs may thus be assisted, which functions according to the model of the waiting line ("first come, first served" or "first in, first out"). The length of the waiting line may be as long as the number of the existing inputs.

If the number of different levels is greater than the number of available inputs, the method may thus be suitable for dynamic utilization of underdimensioned wiring between the multi-switch and the signal source.

An unused input is preferably not connected to any of the outputs. In one alternative specific embodiment, a request received via one of the outputs may not be output via an unused input. These two variants may be used for identification of a used or unused input.

A computer program product according to the present invention includes program code means for carrying out the described method when the computer program product runs on a processing unit or is stored on a computer-readable data carrier.

DETAILED DESCRIPTION OF THE INVENTION

Figure 1:
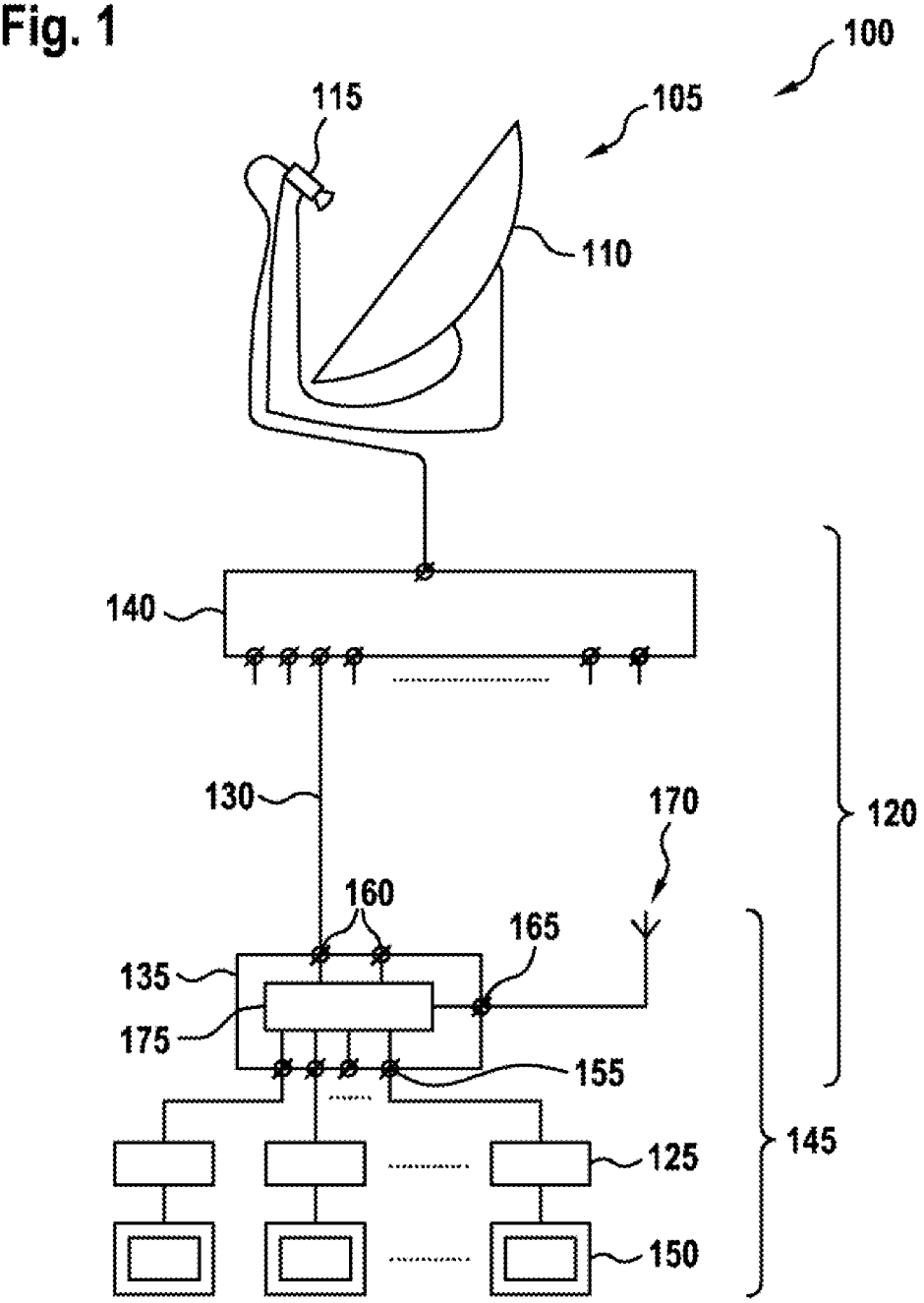
FIG. 1 shows a receiving system for satellite signals.

FIG. 1 shows a system 100 for receiving satellite signals. System 100 includes a satellite antenna 105, which typically includes a parabolic mirror 110 and one or multiple LNB (signal converter(s)) 115. Furthermore, an infrastructure 120 is provided, which distributes signals received with the aid of satellite antenna 105 to one or multiple receiver(s) 125.

Infrastructure 120 may be constructed differently and may include different components, which may in turn be integrated with other components. In any case, one or multiple cable(s) 130 extending in parallel and a multi-switch 135 according to the present invention are provided. In the illustrated specific embodiment, a further multi-switch 140 is provided, which is preferably attached in spatial proximity to satellite antenna 105. In one specific embodiment, further multi-switch 140 may also be integrated with LNB 115. Still further multi-switches 140 may also be provided in the signal connection between satellite antenna 105 and further multi-switch 135. Multiple further multi-switches 135 may also be cascaded within an infrastructure 120.

The infrastructure shown in FIG. 1 corresponds to a receiving system for satellite signals, which distributes signals received via satellite antenna 105 to a plurality of apartments 145, only one of which is shown. It is also characteristic for system 100 that satellite signals may be received from different so-called levels, one cable 130 only being able to transmit signals of one of the levels in each case. Satellite antenna 105 represents a controllable source for satellite signals, optionally with the addition of further multi-switch 140. The control takes place here with the aid of signals which a receiver 125 or multi-switch 135 transmits via cable 130. For example, two different polarization levels and two different frequency bands may be combinable into a total of four levels, switching over between the levels taking place with the aid of a combination of a feed voltage and a pilot tone (bake). In general, however, any arbitrary type of signaling is possible from further multi-switch 140 to satellite antenna 105.

Following Table 1 specifies four different levels for DVB-S signals as examples:

TABLE 1

| level | band | polarization | frequency | voltage |
|-------|------|--------------|-----------|---------|
| LH    | low  | horizontal   | 0 kHz     | 18 V    |
| LV    | low  | vertical     | 0 kHz     | 14 V    |
| HH    | high | horizontal   | 22 kHz    | 18 V    |
| HV    | high | vertical     | 22 kHz    | 14 V    |

A request for one of levels LH, LV, HH, or HV includes a combination of the associated voltage and frequency on the single connection to the source.

If the number of levels on which satellite antenna 105 may provide signals or channels is greater than the number of cables 130, using which apartment 145 or multi-switch 135 is connected to satellite antenna 105, the program selection at multi-switch 135 is thus limited, in that only as many programs may be received from as many levels simultaneously as cables 130 are present. To utilize existing cables 130 in the best possible way and be able to play back a maximum number of channels via playback devices 150, which are connected to receivers 125, multi-switch 135 is configured to relay requests of receivers 125 for levels LH, LV, HH, or HV mentioned as examples according to the sequence of their arrival at further multi-switch 135 to satellite antenna 105.

For this purpose, multi-switch 135 includes a number of outputs 155 and a number of inputs 160. The number of outputs 155 is not restricted. The number of inputs 160 is at least as great as the number of cables 130. As a preparation for a possible later use of additional cables 130, the number of inputs 160 may be as great as the number of levels which may be received via satellite antenna 105. In one specific embodiment, a further input 165 is provided, which may be connected to a terrestrial antenna 170, the signals of which do not pass through cables 130.

Multi-switch 135 includes a switching unit 175 for dynamically connecting inputs 160 to outputs 155 and for relaying requests for predetermined levels from outputs 155 to inputs 160. The connection of outputs 155 to further input 165 may be independent thereof; in particular, the signals of further input 165 may additionally be modulated onto all outputs 155 independently of the signals of satellite antenna 105.

Figure 2:
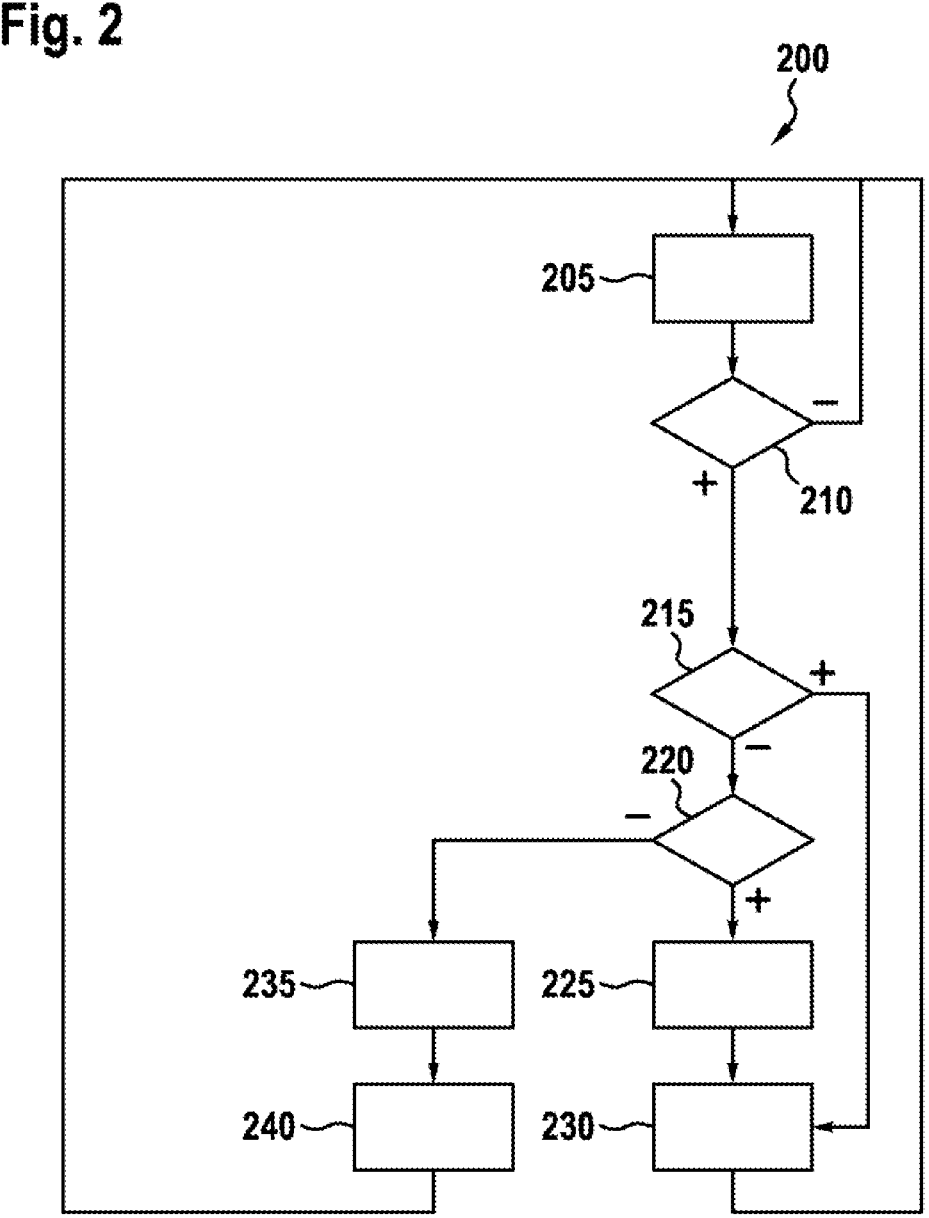
FIG. 2 shows a flow chart of a method for controlling a multi-switch from FIG. 1.

FIG. 2 shows a flow chart of a method 200 for controlling multi-switch 135 from FIG. 1. This again presumes a use of four levels according to Table 1, for example.

In a first step 205, outputs 155 are checked for the presence of requests for one of levels LH, LV, HH, HV. In a following step 210, it is determined whether one of the requests is new, i.e., was not yet handled during a preceding pass of method 200. If this is not the case, method 200 returns to step 205 and may pass through the sequence again.

Method 200 continues with a step 215, in which it is determined whether an input 160 of multi-switch 135 already carries the same request as the newly received request. If this is not the case, it is checked in a step 220 whether an unused input 160 of multi-switch 135 exists. An input 160 may be considered to be unused when it is not connected to any of outputs 155. Alternatively, an unused input 160 may also be identified in that it does not carry a request, for example, in that the voltage at input 160 (cf. Table 1) is less than 14 V, in particular 0 V.

If an unused input 160 exists, the received request is output on unused input 160 in a step 225. Subsequently, in a step 230, output 155, via which the new request was received, is connected to input 160, which carries the same request. Step 230 may also be carried out immediately after it was determined in step 215 that an input 160 having the same request already exists as was received via the output 155 in step 210. In one specific embodiment, step 230 implicitly includes step 225.

If neither an input 160 having the same request nor a free input 160 exists, method 200 optionally continues after step 220 with a step 235, in which an error message is determined. The error message may include in particular a notification of levels LH, LV, HH, or HV, to which other inputs 160 are already assigned. Additionally or alternatively, notifications may be provided of outputs 155 or receivers 125 or playback devices 150 assigned thereto, which are supplied with signals by a used input 160. In another specific embodiment, an anonymous notification of the inability to fulfill the request may also simply be provided.

In a following step 240, the error message provided in step 235 is output at output 155, via which the new request was received in step 210. Subsequently, method 200 may return to step 205 and pass through the sequence again.

FIG. 3 shows exemplary connections inside multi-switch 135 from FIG. 1. Only switching unit 175 is shown, having four exemplary inputs 160 and four exemplary outputs 155. For improved referencing ability, the inputs are identified with 160.A through 160.D and the outputs are identified with 155.A through 155.D.

Figure 3A:
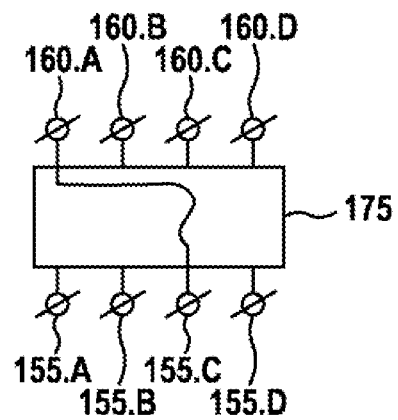
FIGS. 3 through 6 show exemplary connections inside the multi-switch according to one of FIGS. 1 and 2.

In FIG. 3A, a request for signals of a first level has arrived at output 155.C, upon which switching unit 175 outputs this request at input 160.A and conducts the signals through from input 160.A to output 155.C.

Figure 3B:
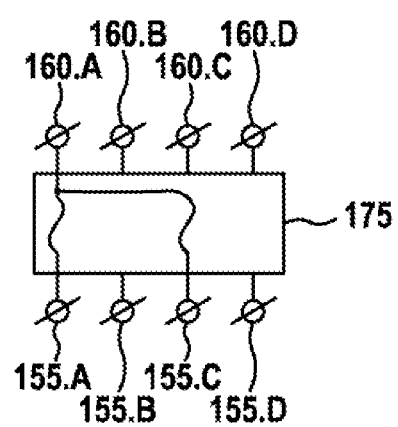

A further request for the first level has arrived via output 155.A in FIG. 3B. Since input 160.A already delivers signals of the newly requested level, output 155.A is connected to input 160.A. Receivers 125, which are connected to outputs 155.A and 155.C, may nonetheless provide different channels, which both lie in the first level.

Figure 3C:
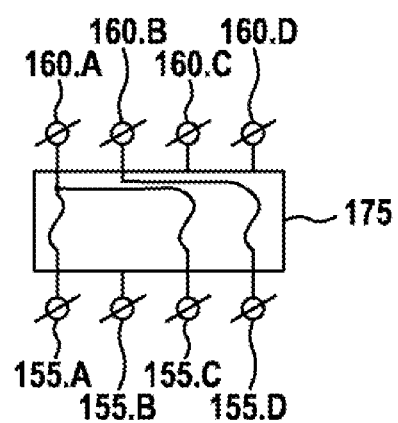

FIG. 3C shows a situation after a request for a second level has been received via output 155.D. The request was output via input 160.B and input 160.D was connected to output 155.B.

In a variety of typical applications, it is possible in the way shown to supply an average apartment 155 with channels from different levels, even if fewer inputs 160 of multi-switch 135 are connected to satellite antenna 105 than levels which may be received by satellite antennas 105. In the example shown in FIG. 3, it is sufficient if inputs 160.A and 160.D are connected to satellite antenna 105 with the aid of cables 130.

Cancellation of connections between inputs 160 and outputs 155 within switching unit 175 preferably takes place when no further request is received via one of outputs 155. An input 160 previously connected to one of outputs 155 may thus become unused again.

Several variants are to be described hereafter of how switching unit 175 proceeds when an existing request at one of outputs 155.A through 155.D expires. The expiration of a request typically indicates the disconnection or deactivation of a receiver 125 connected to output 155. In the example of Table 1, the expiration of the request may be determined, for example, on the basis of a feed voltage of less than 12 V, in particular of approximately 0 V, at output 155. After the expiration of a request, a connection existing up to that point between output 155 and an input 160 is disconnected. It is assumed thereafter that input 160 is not connected to another output 155, so that affected input 160 becomes unused.

In a first variant, input 160 is considered to be free or unused, so that input 160 may be connected at a later point in time on the basis of a new request to one of outputs 155, as described above with reference to method 200, in particular step 220.

In another variant, it is presumed that fewer inputs 160 of multi-switch 135, in which switching unit 175 is situated, are physically connected to further multi-switch 140 than outputs 155 are connected to receivers 125 (cf. FIG. 1). Existing connections are to be left-justified in FIG. 3, however, so that at least first input 160.A is connected, possibly additionally second input 160.B, furthermore possibly additionally third input 160.C, etc. Furthermore, not all requests may be served by further multi-switch 140 from connected inputs 160 under certain circumstances, for example, because further multi-switch 140 may not provide signals from a corresponding number of different levels. A request which is not served finally does not provide a useful signal to requesting receiver 125.

If switching unit 175 or multi-switch 135 enclosing it may recognize whether a request applied at one of inputs 160 is not served, an input 160, the assigned request of which expires, may be connected to an output 155, connected output 160 of which was not served by further multi-switch 140.

Figure 4A:
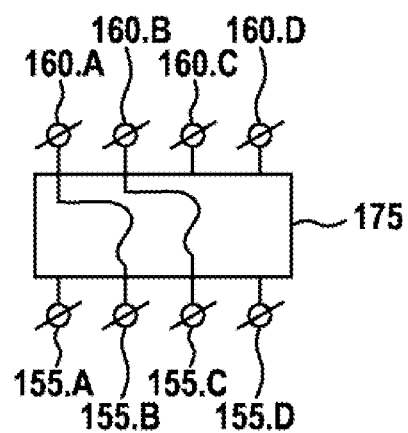
Figure 4B:
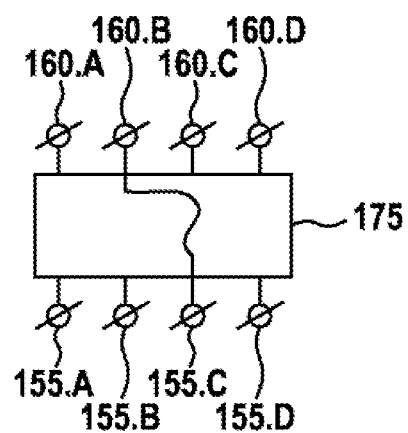

FIG. 4 illustrates this operation. In FIG. 4A, two connections exist between inputs 160 and outputs 155. The request of second input 160.B may not be served by further multi-switch 140, so that receiver 125 connected to output 155.C finally does not receive a useful signal. FIG. 4B shows the situation at a later point in time, at which the request at output 155.B has expired, so that input 160.A becoming unused may be newly assigned.

Figure 4C:
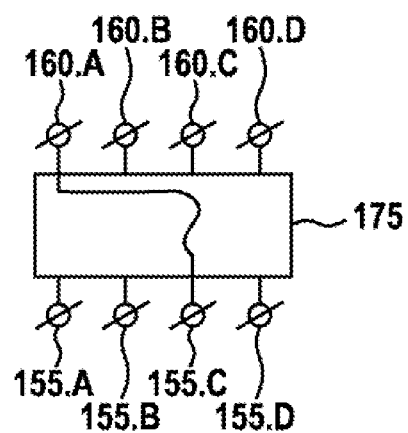

FIG. 4C shows a connection established thereupon of output 155.C to input 160.A which became unused. The previously existing connection of input 160.A to input 160.B was disconnected.

If it may not be determined whether a request at one of inputs 160 was served or not, an output 155 which is connected to a lower priority input 160 (further to the left here) may be switched over thereto when a higher priority input 160 (further to the right here) becomes unused. FIG. 5 illustrates this procedure.

Figure 5A:
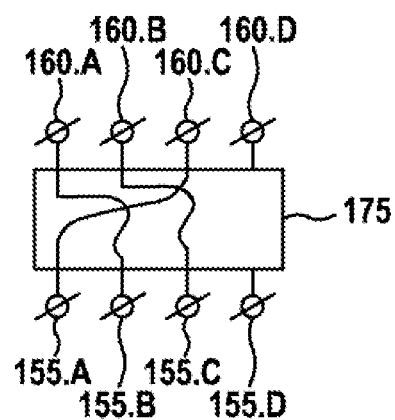
Figure 5B:
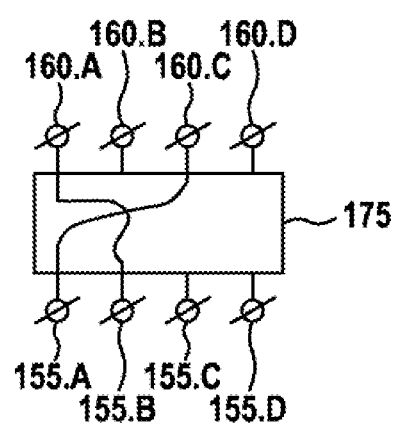
Figure 5C:
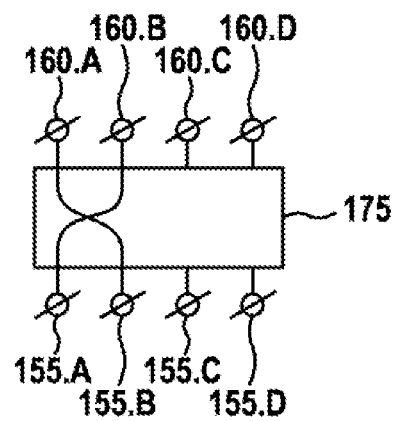

In FIG. 5A, three connections exist between outputs 155 and inputs 160. In FIG. 5B, the request of output 155.C has expired, so that the connection to input 160.B was disconnected. Input 160.C has a lower priority than input 160.B and it is not known whether the request output at input 160.C could be served by further multi-switch 140 or not. FIG. 5C shows how the previously applicable connection between output 155.A and input 160.C was disconnected and output 155.A is now connected to input 160.B which became unused. This change of the connection of output 155.A takes place to a certain extent "on spec" and ideally requires the possibility of changing connections within switching units 175, without causing recognizable disturbances in the data stream conducted through switching unit 175 at one of outputs 155.

Figure 6A:
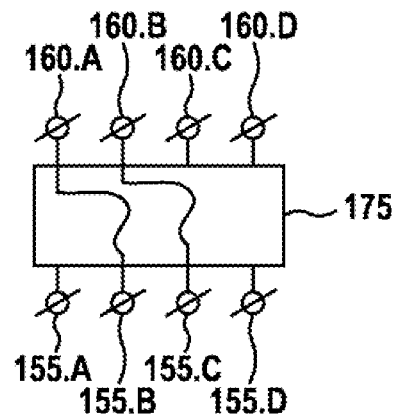

If it may not be recognized on the part of switching unit 175 or multi-switch 135 whether a request was served at one of inputs 160, nor is a disturbance-free switchover of one of outputs 155 between different inputs 160 possible, an input 160 which is becoming unused may thus be reassigned in an advantageous procedure, which is shown in FIG. 6.

Figure 6B:
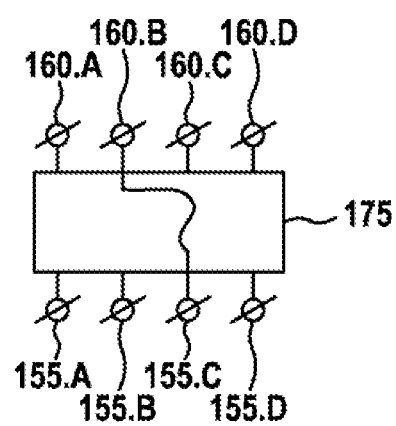
Figure 6C:
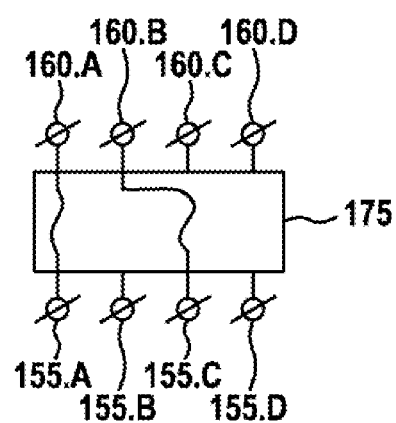

In FIG. 6A, two connections again exist between inputs 160 and outputs 155 within switching unit 175. In FIG. 6B, the request at output 155.B expires, so that the connection to input 160.A was disconnected. In FIG. 6C, a new request for a level, which has already been requested via input 160.B, was received via one of outputs 155, in the illustration via output 155.A. Instead of connecting output 155.A to input 160.D, it is connected to input 160.A, which has a higher priority than input 160.B. It may thus be ensured that higher priority inputs 160 are utilized better. This may contribute to serving the incoming requests at outputs 155 in an improved way.

What is claimed is:

1. A device for distributing satellite signals that are received at a satellite antenna and that are parseable into a plurality of N different levels, the device comprising:
   a switch;
   a plurality of inputs that are each (1) assignable for providing all of the N different levels, but only for providing one of the N different levels at any one time and (2) connectable to the satellite antenna for obtaining the different levels of the satellite signals; and
   a plurality of outputs to receivers for providing the levels of the satellite signals from the plurality of inputs to the receivers;
   wherein:
      a total number of the plurality of inputs that are simultaneously connectable to the satellite antenna for obtaining the levels of the satellite signals is less than N;
      each of the plurality of inputs is assigned a respective priority level;
      the device is configured to control the assignments of the inputs for the providing of respective ones of the N different levels and to control the switch to dynamically and variably connect respective ones of the plurality of outputs to respective ones of the inputs such that, in response to a request from a first one of the receivers for one of the N different levels at a time when none of the plurality of inputs is assigned for providing the requested level, of a subgroup of the plurality of inputs that includes those of the plurality of inputs that are not in use for providing any of the levels of the satellite signals to any of the outputs, whichever is, relative to all others of the subgroup, assigned a highest one of the priority levels is assigned to the requested level and is connected by the switch to one of the outputs, which is connected to the first receiver, for providing the requested level to the first receiver.

2. The device as recited in claim 1, wherein the switch is configured to reject a received request for a level if the request is, based on the priority levels, assigned for servicing by an input which is not, at a time of the request, able to receive the satellite signals and no further input presently available for connection to the source is present.

3. The device as recited in claim 2, wherein the switch is configured to output an error signal via the output, via which the request was received.

4. The device as recited in claim 3, further comprising:
   a further input for connection to a further signal source in a frequency range independent of the satellite reception, wherein the switch is configured to make the independent frequency range available on all outputs.

5. The device as recited in claim 1, wherein, responsive to a disconnection of a first one of the inputs from providing a first one of the levels to the outputs:
   disconnecting a first one of the outputs from a second one of the inputs that is providing to the first output a second one of the levels and that assigned a lower priority than a priority assigned to the first input; and
   connecting the first output to the first input to continue receiving the second level from the first input instead of the second input.

6. A method for distributing satellite signals that are received at a satellite antenna and that are parseable into a plurality of N different levels, the method being performed using a multi-switch, the multi-switch including (a) a plurality of inputs that are each (1) assignable for providing all of the N different levels, but only for providing one of the N different levels at any one time and (2) connectable to the satellite antenna for obtaining the different levels of the satellite signals and (b) a plurality of outputs to receivers for providing the levels of the satellite signals from the plurality of inputs to the receivers, wherein a total number of the plurality of inputs that are simultaneously connectable to the satellite antenna for obtaining the levels of the satellite signals is less than N and each of the plurality of inputs is assigned a respective priority level, the method comprising:
   receiving, by a device and via a first of the plurality of outputs that is connected to a first one of the receivers, a request from the first receiver for one of the N different levels at a time when none of the plurality of inputs is assigned for providing the requested level; and
   the device responding, to the request by:
      of a subgroup of the plurality of inputs that includes those of the plurality of inputs that are not in use for providing any of the levels of the satellite signals to any of the outputs, selecting whichever one of the inputs of the subgroup that is, relative to all others of the subgroup, assigned a highest one of the priority levels;
      assigning the selected input to the requested level and is connected by the switch to one of the outputs, which is connected to the first receiver; and
      using the switch to connect the selected input to the first output to provide the requested level to the first output from the selected input.

7. A non-transitory, computer-readable data storage medium storing a computer program having program codes which, when executed on a computer, causes the computer to perform a method for distributing satellite signals that are received at a satellite antenna and that are parseable into a plurality of N different levels, the method being performed using a multi-switch, the multi-switch including (a) a plurality of inputs that are each (1) assignable for providing all of the N different levels, but only for providing one of the N different levels at any one time and (2) connectable to the satellite antenna for obtaining the different levels of the satellite signals and (b) a plurality of outputs to receivers for providing the levels of the satellite signals from the plurality of inputs to the receivers, wherein a total number of the plurality of inputs that are simultaneously connectable to the satellite antenna for obtaining the levels of the satellite signals is less than N and each of the plurality of inputs is assigned a respective priority level, the method comprising:

receiving, via a first of the plurality of outputs that is connected to a first one of the receivers, a request from the first receiver for one of the N different levels at a time when none of the plurality of inputs is assigned for providing the requested level; and responding, to the request by:

of a subgroup of the plurality of inputs that includes those of the plurality of inputs that are not in use for providing any of the levels of the satellite signals to any of the outputs, selecting whichever one of the inputs of the subgroup that is, relative to all others of the subgroup, assigned a highest one of the priority levels;

assigning the selected input to the requested level and is connected by the switch to one of the outputs, which is connected to the first receiver; and using the switch to connect the selected input to the first output to provide the requested level to the first output from the selected input.

\* \* \* \* \*